United States Patent
Choi et al.

(10) Patent No.: US 11,739,806 B2
(45) Date of Patent: Aug. 29, 2023

(54) ELECTROMECHANICAL BRAKE SYSTEM HAVING SUSPENSION CONTROL FUNCTION

(71) Applicants: HYUNDAI MOTOR COMPANY, Seoul (KR); KIA MOTORS CORPORATION, Seoul (KR)

(72) Inventors: Hae Ryong Choi, Seoul (KR); Dong Yoon Hyun, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 371 days.

(21) Appl. No.: 17/021,146

(22) Filed: Sep. 15, 2020

(65) Prior Publication Data
US 2021/0108692 A1    Apr. 15, 2021

(30) Foreign Application Priority Data
Oct. 11, 2019   (KR) .................. 10-2019-0125795

(51) Int. Cl.
| | | |
|---|---|---|
| *F16D 67/06* | (2006.01) | |
| *B60G 17/015* | (2006.01) | |
| *B60G 17/016* | (2006.01) | |
| *F16D 65/18* | (2006.01) | |

(Continued)

(52) U.S. Cl.
CPC .......... *F16D 67/06* (2013.01); *B60G 17/0157* (2013.01); *B60G 17/0162* (2013.01); *F16D 65/18* (2013.01); *B60G 2200/10* (2013.01); *B60G 2400/0513* (2013.01); *B60G 2400/104* (2013.01); *B60G 2400/208* (2013.01); *B60G 2400/41* (2013.01); *B60G 2500/00* (2013.01);

(Continued)

(58) Field of Classification Search
CPC .......... F16D 67/06; F16D 65/18; F16D 65/28; B60G 17/0157; B60G 17/0162
See application file for complete search history.

(56) References Cited

U.S. PATENT DOCUMENTS

| | | | | |
|---|---|---|---|---|
| 2,998,970 A | * | 9/1961 | Latta .................... | B60G 17/023 |
| | | | | 280/DIG. 1 |
| 5,074,388 A | * | 12/1991 | Dodd ...................... | F16D 51/20 |
| | | | | 188/325 |

(Continued)

FOREIGN PATENT DOCUMENTS

| | | |
|---|---|---|
| JP | H10-154002 A | 6/1998 |
| JP | 2005-532215 A | 10/2005 |

(Continued)

*Primary Examiner* — Frank B Vanaman
(74) *Attorney, Agent, or Firm* — Lempia Summerfield Katz LLC (57) ABSTRACT

An electromechanical brake system having a suspension control function. The electromechanical brake system includes: an electromechanical brake connected to each wheel of a vehicle to brake the vehicle, a suspension configured to control suspension of the vehicle, a motor configured to provide driving force to the electromechanical brake or to the suspension, a first clutch configured to connect the electromechanical brake and the motor to each other, a second clutch configured to connect the suspension and the motor to each other, and a controller configured to output a control signal for controlling the motor to be connected to one of the first clutch and the second clutch based on a state signal of the vehicle.

13 Claims, 5 Drawing Sheets

(51) Int. Cl.
 *F16D 121/20* (2012.01)
 *F16D 125/56* (2012.01)
 *F16D 125/40* (2012.01)

(52) U.S. Cl.
 CPC .. *B60G 2600/182* (2013.01); *B60G 2800/016* (2013.01); *B60G 2800/22* (2013.01); *B60G 2800/24* (2013.01); *B60G 2800/912* (2013.01); *F16D 2121/20* (2013.01); *F16D 2125/40* (2013.01); *F16D 2125/565* (2013.01); *F16D 2500/10418* (2013.01); *F16D 2500/1107* (2013.01); *F16D 2500/314* (2013.01); *F16D 2500/316* (2013.01); *F16D 2500/3109* (2013.01); *F16D 2500/3115* (2013.01)

(56) References Cited

U.S. PATENT DOCUMENTS

| | | | | |
|---|---|---|---|---|
| 5,296,785 | A * | 3/1994 | Miller | B60G 17/0157 318/687 |
| 5,949,168 | A * | 9/1999 | Dieckmann | B60T 13/741 188/71.7 |
| 6,113,119 | A * | 9/2000 | Laurent | B60G 17/0157 280/124.1 |
| 6,176,352 | B1 * | 1/2001 | Maron | G01L 5/225 188/72.1 |
| 10,899,340 | B1 * | 1/2021 | Hitzinger | B60W 10/14 |
| 2004/0124042 | A1 * | 7/2004 | Kriz, II | F16D 65/18 188/162 |
| 2008/0141818 | A1 * | 6/2008 | Schadler | B60T 13/746 74/501.5 R |
| 2010/0025131 | A1 | 2/2010 | Gloceri et al. | |
| 2014/0034432 | A1 * | 2/2014 | Bull | B60T 13/741 188/106 R |

FOREIGN PATENT DOCUMENTS

| | | |
|---|---|---|
| KR | 10-2013-0000996 A | 1/2013 |
| KR | 10-1894382 B | 9/2018 |

* cited by examiner

| CURRENT CONTROL STATE OF VEHICLE | CONTROL REQUIRED FOR VEHICLE | CONTROL STRATEGY |
|---|---|---|
| NORMAL TRAVELING | HIGH-SPEED ABRUPT STEERING AND BRAKING | BRAKING CONTROL BY ELECTROMECHANICAL BRAKE |
| BRAKED BY ELECTROMECHANICAL BRAKE | HIGH-SPEED ABRUPT STEERING | BRAKING CONTROL RETENTION BY ELECTROMECHANICAL BRAKE |
| | BRAKING | BRAKING CONTROL RETENTION BY ELECTROMECHANICAL BRAKE |
| CONTROLLED BY SUSPENSION | HIGH-SPEED ABRUPT STEERING | CONTROL RETENTION BY SUSPENSION |
| | BRAKING | BRAKING CONTROL BY ELECTROMECHANICAL BRAKE |

ELECTROMECHANICAL BRAKE SYSTEM HAVING SUSPENSION CONTROL FUNCTION

CROSS-REFERENCE TO RELATED APPLICATION

This application claims priority to and the benefit of Korean Patent Application No. 10-2019-0125795, filed on Oct. 11, 2019, the entire contents of which are incorporated herein by reference.

FIELD

The present disclosure relates to an electromechanical brake system having a suspension control function that is capable of controlling both a suspension and an electromechanical brake.

BACKGROUND

The statements in this section merely provide background information related to the present disclosure and may not constitute prior art.

In general, a brake device of a vehicle is a device that generates braking force desired to decelerate or stop the vehicle or to maintain the state in which the vehicle is stopped. When the vehicle is decelerated, kinetic energy of the vehicle is converted into thermal energy due to mechanical friction, and the frictional heat is discharged to the air. Examples of such a brake device for vehicles include a drum type hydraulic brake and a disc type hydraulic brake. The disc type hydraulic brake is configured such that frictional pads strongly press surfaces of a disc rotated with each wheel in order to obtain braking force. However, the hydraulic brake requires mechanical elements connected to a brake pedal of a driver seat, hydraulic pipes, and hydraulic control elements, whereby the structure of the hydraulic brake is complicated. In order to simplify the structure of the brake device, an electromechanical brake (EMB) has been developed and used.

In addition, a suspension is a device that effectively interrupts irregular input of a road surface generated during traveling of the vehicle to provide excellent ride comfort to a passenger and to secure stability of the vehicle when the vehicle is turned and braked. In particular, an active geometry control suspension system (AGCS) capable of actively controlling suspension of the vehicle depending on the state of the vehicle has been applied to vehicles.

In the case in which the electromechanical brake and the active geometry control suspension system are simultaneously applied to a vehicle, however, a motor and an actuator for controlling each of the electromechanical brake and the active geometry control suspension system are required. In addition, a controller for controlling the operation of each of the electromechanical brake and the active geometry control suspension system is additionally required. In the case in which the electromechanical brake and the active geometry control suspension system are simultaneously applied to the vehicle, additional motors, actuators, and controllers are required, whereby the weight of the vehicle is increased, and excessive expenses are necessary to apply an integrated system to the vehicle.

The above information disclosed in this Background section is provided only for enhancement of understanding of the background of the present disclosure and therefore it may contain information that does not form the prior art that is already known to a person of ordinary skill in the art.

SUMMARY

The present disclosure provides an electromechanical brake system having a suspension control function that is capable of controlling both a suspension and an electromechanical brake.

The present disclosure also provides an electromechanical brake system having a suspension control function that is capable of actively performing control for securing stability of a vehicle based on a state signal of the vehicle.

The objects of the present disclosure are not limited to those described above. The objects of the present disclosure will be clearly understood from the following description and could be implemented by means defined in the claims and a combination thereof.

In one aspect of the present disclosure, an electromechanical brake system having a suspension control function includes: an electromechanical brake connected to each wheel of a vehicle to brake the vehicle, a suspension configured to control suspension of the vehicle, a motor configured to provide driving force to the electromechanical brake or to the suspension, a first clutch configured to selectively connect the electromechanical brake and the motor to each other, a second clutch configured to selectively connect the suspension and the motor to each other, and a controller configured to output a control signal for controlling the motor to be connected to one of the first clutch and the second clutch based on a state signal of the vehicle.

In one form, the state signal may be a signal indicating whether the vehicle is normally traveling, is abruptly steered, or is abruptly braked.

In other form, the controller is configured to output the state signal by analyzing signals received from a sensor unit mounted in the vehicle, and the sensor unit may include at least one of a yaw rate sensor, a lateral acceleration sensor, a wheel speed sensor, or a steering angle sensor.

In some forms of the present disclosure, the first clutch includes a first coil configured to generate a first magnetic force, and a first coupler configured to couple to the motor when received the first magnetic force, and the second clutch includes a first coil configured to generate a first magnetic force, and a first coupler configured to couple to the motor when received the first magnetic force. In particular, when the first coupler is coupled to the motor, the first clutch is configured to transmit a driving force of the motor to the electromechanical brake, and when the second coupler is coupled to the motor, the second clutch is configured to transmit the driving force of the motor to the suspension.

In some forms of the present disclosure, the first clutch and the electromechanical brake may be connected to each other via a first flexible cable, and the first flexible cable may be configured to transmit driving force of the motor to a screw of the electromechanical brake.

In some forms of the present disclosure, the screw of the electromechanical brake may be configured to convert rotational motion of the first flexible cable into rectilinear motion, and the screw of the electromechanical brake may be configured to press a frictional pad configured to brake each wheel of the vehicle.

In some forms of the present disclosure, the second clutch and the suspension may be connected to each other via a second flexible cable, and the second flexible cable may be configured to transmit driving force of the motor to a screw of the suspension.

In some forms of the present disclosure, the screw of the suspension may be configured to convert rotational motion of the second flexible cable into rectilinear motion, and the screw of the suspension may be configured to change a position of an assist link of the suspension.

In some forms of the present disclosure, the controller may be configured to output the control signal for connecting the first clutch and the motor to each other upon determining that the vehicle is braked as a result of analyzing the state signal.

In some forms of the present disclosure, the controller may be configured to output the control signal for connecting the second clutch and the motor to each other upon determining that the vehicle is abruptly steered as a result of analyzing the state signal.

In some forms of the present disclosure, the controller may be configured to output the control signal for connecting the first clutch and the motor to each other upon determining that the vehicle is simultaneously braked and abruptly steered as a result of analyzing the state signal.

In some forms of the present disclosure, the controller may be configured to output the control signal for continuously connecting the first clutch and the motor to each other upon determining that the vehicle is abruptly steered as a result of analyzing the state signal in the state in which the first clutch and the motor are connected to each other.

In some forms of the present disclosure, the controller may be configured to output the control signal for connecting the first clutch and the motor to each other upon determining that the vehicle is braked as a result of analyzing the state signal in the state in which the second clutch and the motor are connected to each other.

Other forms of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Advantages and features of the present disclosure and methods for achieving the same will be clearly understood with reference to the following detailed description in conjunction with the accompanying drawings. However, the present disclosure is not limited to the forms disclosed herein and may be implemented in various different forms.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and use environment.

The term "unit" or "module" used in this specification signifies one unit that processes at least one function or operation, and may be realized by hardware, software, or a combination thereof.

In addition, relational terms, such as "first" and "second," are used in this specification only to distinguish between the same elements, and the elements are not limited as to the sequence therebetween in the following description.

The present disclosure may be used in various different combinations, changes, and environments. That is, variations or modifications can be made within the conceptual scope of the present disclosure, equivalents to the disclosure of the present disclosure, and/or the scope of technology and knowledge in the art to which the present disclosure pertains. The forms describe the best mode for realizing the technical concept of the present disclosure, and variations required for the concrete application and use of the present disclosure are possible.

Figure 1:
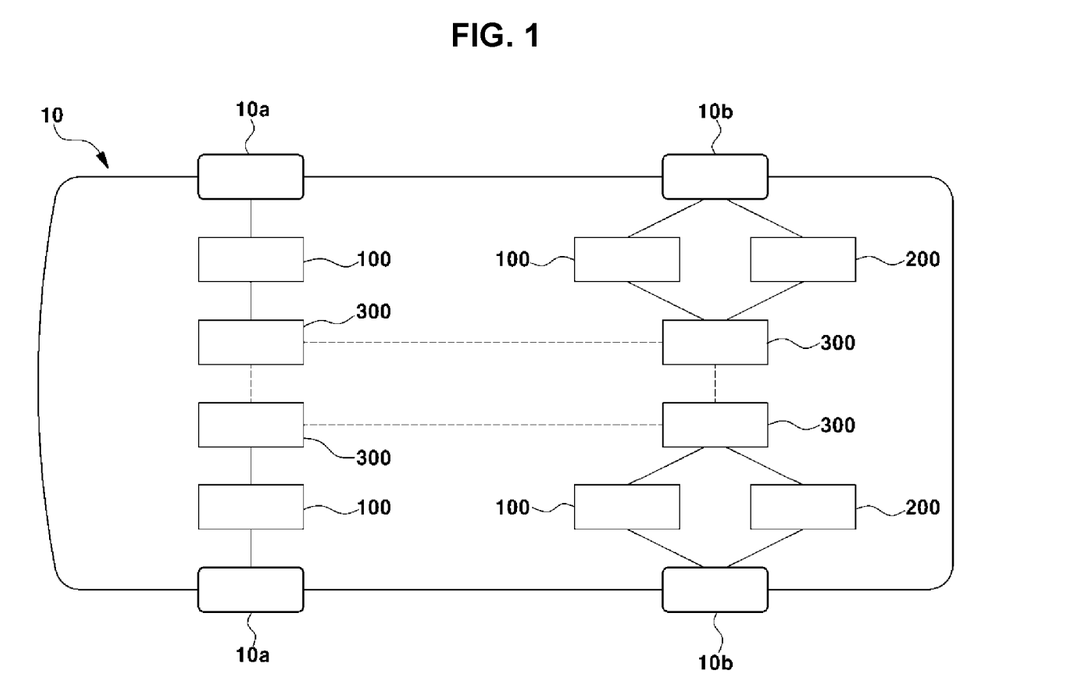
FIG. 1 is a view showing a vehicle to which a suspension and an electromechanical brake system in one form of the present disclosure are applied.

FIG. 1 is a view showing a vehicle to which a suspension and an electromechanical brake system according to one form of the present disclosure are applied.

Referring to FIG. 1, an electromechanical brake (EMB) 100 may be applied to each of front wheels 10*a* and rear wheels 10b of a vehicle 10. The electromechanical brake 100 may mean a brake that presses a frictional pad using a mechanical mechanism driven by an electric motor in order to obtain braking force, unlike a general hydraulic brake. The electromechanical brake may press a disc disposed at each of the front wheels 10a and the rear wheels 10b using driving force generated by a motor (not shown), and thus the electromechanical brake may brake the vehicle 10 when pressing the disc. The electromechanical brake 100 is simpler in structure, is faster in response speed, and is capable of performing more accurate control than the hydraulic brake, thereby improving braking safety performance.

An active suspension 200 may be applied to each of the rear wheels 10b of the vehicle 10. In the present disclosure, the active suspension 200 may mean an active geometry control suspension system (AGCS). The active suspension 200 may change geometry of a rear suspension for vehicles using an electrically operated motor (not shown), and may increase roll steering quantity when the vehicle is turned, thereby increasing grip force of each of the rear wheels 10b.

In one form of the present disclosure, an electromechanical brake system having a suspension control function may include: a single motor (not shown) capable of simultaneously controlling the electromechanical brake 100 and the suspension 200, and a controller 300 for controlling one of the electromechanical brake 100 and the suspension 200. That is, a single controller 300 may simultaneously control the electromechanical brake 100 and the suspension 200 disposed at each of the rear wheels 10b of the vehicle 10. In the vehicle 10, to which the electromechanical brake 100 is applied, the controller 300 may be provided for each wheel, and the controller 300 provided at each of the rear wheels 10b may simultaneously control the electromechanical brake 100 and the suspension 200. Four controllers 300 may be electrically connected to each other. In the case in which one of the four controllers 300 is out of order, the controllers 300 that are normally operated may perform the function of the controller 300 that is out of order.

In one form of the present disclosure, the controller 300 for controlling the electromechanical brake 100 and the controller 300 for controlling the active suspension 200 may be integrated. Consequently, the number of controllers 300 mounted in the vehicle 10 may be reduced. Also, in another form of the present disclosure, a single motor (not shown) may provide driving force to each of the electromechanical brake 100 and the suspension 200, whereby the number of motors (not shown) mounted in the vehicle 10 may be reduced.

Figure 2:
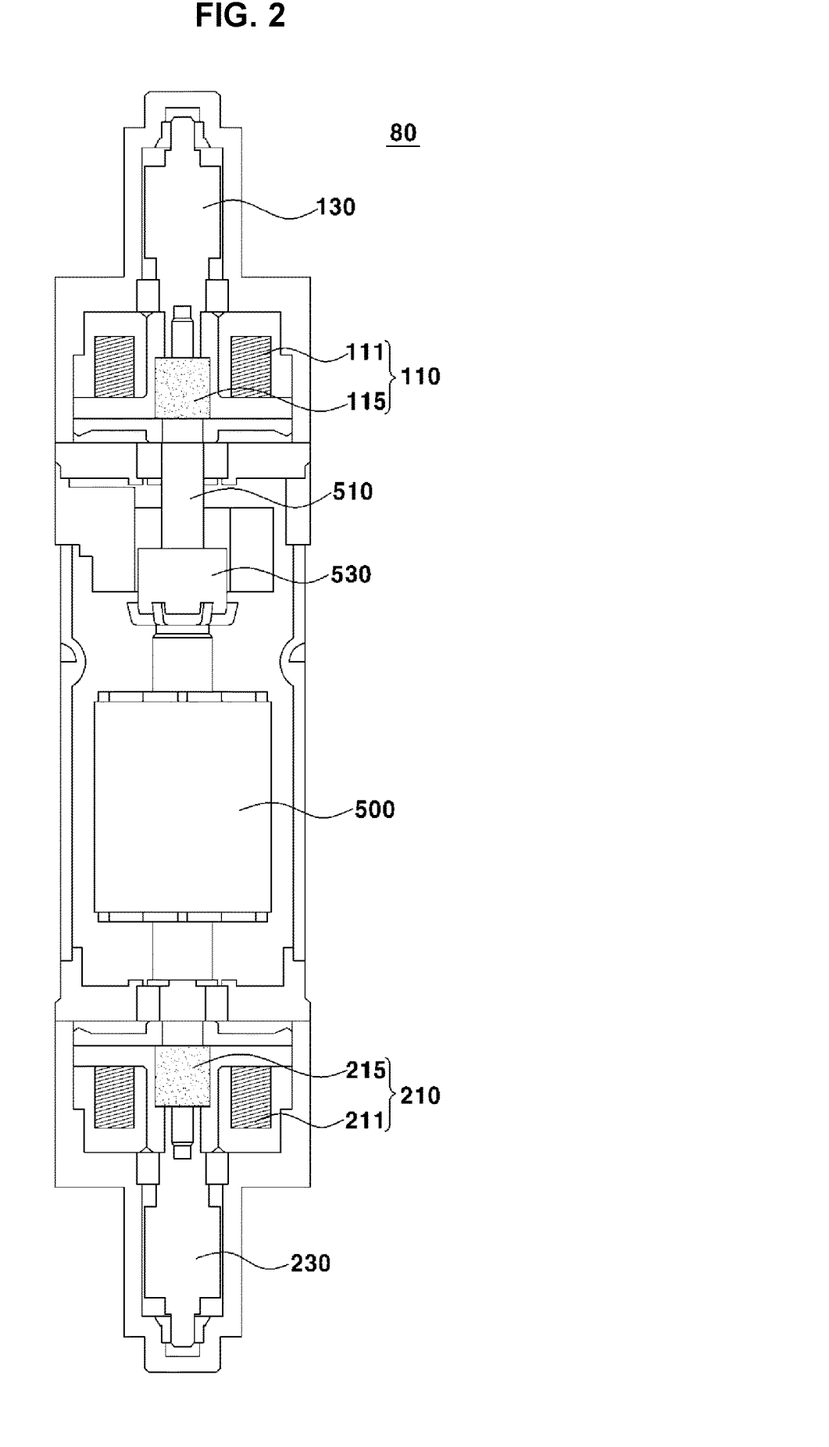
FIG. 2 is a view showing an integrated motor assembly in one form of the present disclosure.

FIG. 2 is a view showing an integrated motor assembly 80 according to one form of the present disclosure.

Referring to FIGS. 1 and 2, the integrated motor assembly 80 may include a motor 500, a first clutch 110, a second clutch 210, a first flexible cable 130, and a second flexible cable 230. The integrated motor assembly 80 may control both the electromechanical brake 100 and the suspension 200. In order to provide driving force to each of the electromechanical brake 100 and the suspension 200, the integrated motor assembly 80 may provide driving force to each of the electromechanical brake 100 and the suspension 200. Thus, a separate motor and an actuator are not required.

The motor 500 may provide rotational force desired to generate braking force. The rotational force generated by the motor 500 may be transmitted to the first clutch 110 or the second clutch 210 via a motor shaft 510. The motor shaft 510 may extend through a commutator 530. The commutator 530 may keep current flowing in a winding of the motor 500 constantly in one direction.

The first clutch 110 may physically connect the motor 500 and the first flexible cable 130 to each other, and the second clutch 210 may physically connect the motor 500 and the second flexible cable 230 to each other. The first clutch 110 and the second clutch 210 may be electrically connected to the controller 300. The first clutch 110 and the second clutch 210 may be connected to or disconnected from the motor 500 according to a control signal from the controller 300. That is, the first clutch 110 and the second clutch 210 may be physically connected to the motor 500 when current from the controller 300 is applied thereto.

The first clutch 110 may include a first coil 111 for generating magnetic force due to current applied by the controller 300 and a first coupler 115 that is physically coupled to the motor 500 due to the magnetic force generated by the first coil 111. The first coupler 115 may be magnetized due to the magnetic force generated by the first coil 111, and may be connected to the motor shaft 510. For example, the first coupler 115 may be a kind of electromagnet.

The second clutch 210 may include a second coil 211 for generating magnetic force due to current applied by the controller 300 and a second coupler 215 that is physically coupled to the motor 500 due to the magnetic force generated by the second coil 211. The second coupler 215 may be magnetized due to the magnetic force generated by the second coil 211, and may be connected to the motor shaft 510. For example, the second coupler 215 may be a kind of electromagnet.

The first flexible cable 130 may be connected to the first clutch 110 to transmit the rotational force of the motor 500 to the electromechanical brake 100. The first flexible cable 130 may mean a rigid cable capable of transmitting the rotational force of the motor 500. The first flexible cable 130 may also be rotated with rotation of the motor shaft 510.

The second flexible cable 230 may be connected to the second clutch 210 to transmit the rotational force of the motor 500 to the suspension 200. The second flexible cable 230 may mean a rigid cable capable of transmitting the rotational force of the motor 500. The second flexible cable 230 may also be rotated with rotation of the motor shaft 510.

In one form of the present disclosure, the motor 500 and the electromechanical brake 100 or the motor 500 and the suspension 200 may be mechanically connected to each other according to a control signal that the controller 300 applies to the first clutch 110 and the second clutch 210. In order to control each of the electromechanical brake 100 and the suspension 200, therefore, two motors are not required, and a single integrated motor assembly 80 may control each of the electromechanical brake 100 and the suspension 200.

Figure 3:
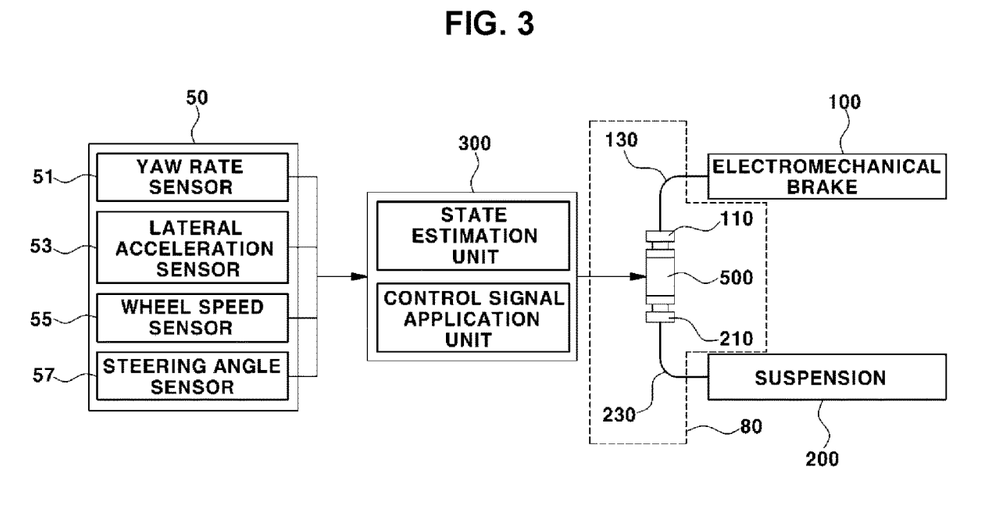
FIG. 3 is a view showing an electromechanical brake system having a suspension control function according to one form of the present disclosure.

FIG. 3 is a view showing an electromechanical brake system having a suspension control function according to one form of the present disclosure.

Referring to FIGS. 2 and 3, the electromechanical brake system 1 having the suspension control function may include a sensor unit 50, a controller 300, and an integrated motor assembly 80.

The sensor unit 50 may include a yaw rate sensor 51, a lateral acceleration sensor 53, a wheel speed sensor 55, and a steering angle sensor 57. Information of the vehicle sensed by the sensor unit 50 may be transmitted to the controller 300.

The yaw rate sensor 51 may sense a changing speed of a rotational angle (a yaw angle) around a perpendicular line passing through the center of the vehicle. The yaw rate sensor 51 may sense a change in the behavior of the vehicle in a yaw direction due to steering change or braking.

The lateral acceleration sensor 53 may sense acceleration of the vehicle that is changed in a lateral direction. In an example, the lateral acceleration sensor 53 may sense a change in the behavior of the vehicle in the lateral direction due to steering change or braking.

The wheel speed sensor 55 may sense a change in speed of the vehicle in a longitudinal direction. The wheel speed sensor 55 may be disposed at each of the front wheels and the rear wheels of the vehicle. That is, the wheel speed sensor 55 may sense the speed of the front wheels and the speed of the rear wheels.

The steering angle sensor 57 may sense a change in steering of the vehicle. That the steering angle sensor 57 senses a change in steering of the vehicle may mean that a driver of the vehicle has changed steering. In an example, the steering angle sensor 57 may sense whether the vehicle has been abruptly steered.

In another form, the sensor unit 50 may include a camera, a radar, and a lidar for determining whether the vehicle has been abruptly steered and abruptly braked.

The controller 300 may estimate the state of the vehicle based on the information of the vehicle transmitted by the sensor unit 50, and may output a control signal for controlling the integrated motor assembly 80 based on the state of the vehicle. The controller 300 may include a state estimation unit 310 for analyzing the information of the vehicle transmitted by the sensor unit 50 to estimate the state of the vehicle and a control signal application unit 330 for outputting a control signal based on the state of the vehicle.

The state estimation unit 310 may determine whether the vehicle is normally traveling, has been abruptly steered, or has been abruptly braked. The state estimation unit 310 may transmit a state signal related to the current state of the vehicle to the control signal application unit 330.

The control signal application unit 330 may output a first control signal for generating output desired for the motor 500 and a second control signal for physically coupling the first clutch 110 and the second clutch 210 to each other. The control signal application unit 330 may apply the second control signal to one of the first clutch 110 and the second clutch 210 based on the state signal of the vehicle. In the case in which the second control signal is applied to the first clutch 110, the first clutch 110 may be physically coupled to the motor shaft 510. Consequently, the rotational force of the motor 500 may be transmitted to the electromechanical brake 100. In the case in which the second control signal is applied to the second clutch 210, the second clutch 210 may be physically coupled to the motor shaft 510. Consequently, the rotational force of the motor 500 may be transmitted to the suspension 200.

Figure 4:
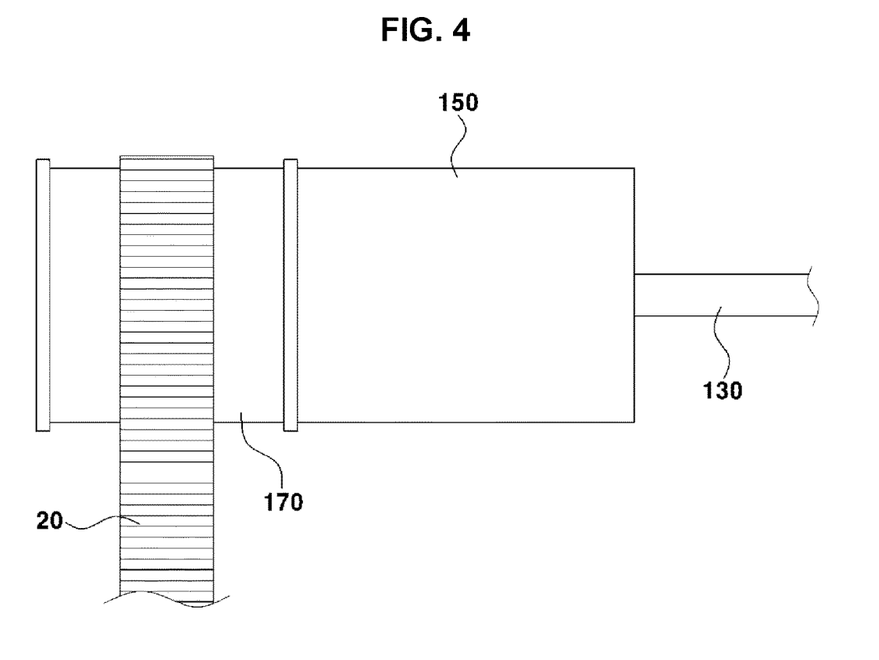
FIG. 4 is a view showing a connection relationship between a screw of an electromechanical brake and a first flexible cable according to another form of the present disclosure.

FIG. 4 is a view showing a connection relationship between a screw of the electromechanical brake and the first flexible cable according to one form of the present disclosure.

Referring to FIGS. 2 to 4, when the second control signal is applied to the first clutch 110, the first clutch 110 may be physically coupled to the motor shaft 510, whereby the rotational force of the motor 500 may be transmitted to the first flexible cable 130. A screw 150, which is a component of the electromechanical brake 100, may convert the rotation force of the motor 500 transmitted by the first flexible cable 130 into rectilinear motion. That is, the screw 150 of the electromechanical brake may convert rotational motion of the first flexible cable 130 into rectilinear motion. The screw 150 of the electromechanical brake may press a frictional pad 170 for braking each of the wheels of the vehicle. The rectilinear motion of the screw 150 of the electromechanical brake may press the frictional pad 170, and the frictional pad 170 may press a disc 30 of each of the wheels of the vehicle. Consequently, the vehicle may be braked.

Figure 5:
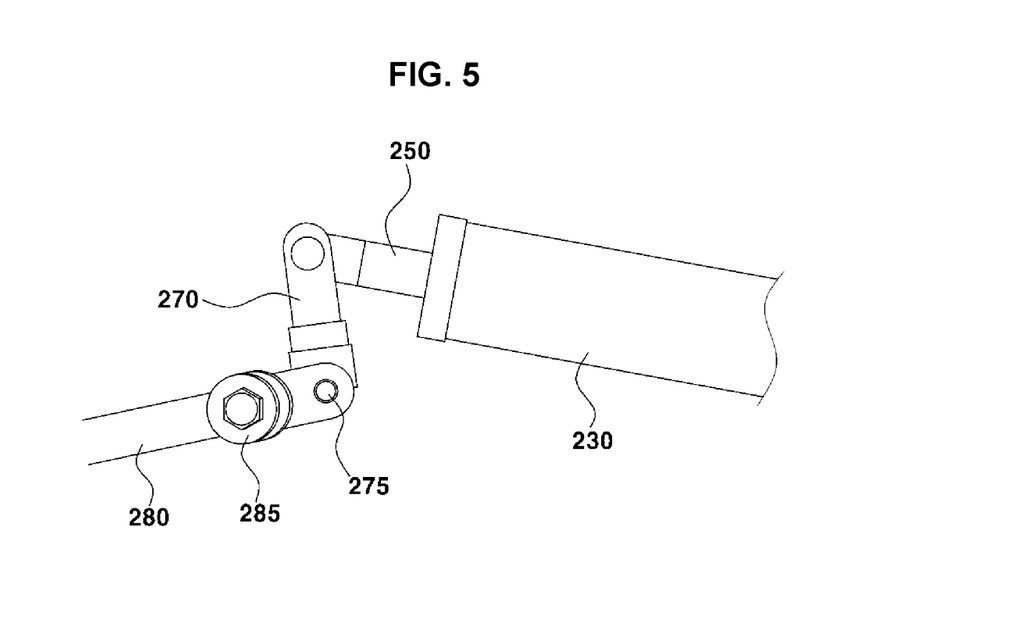
FIG. 5 is a view showing a connection relationship between a lead screw of a suspension and a second flexible cable according to one form of the present disclosure.

FIG. 5 is a view showing a connection relationship between a lead screw of the suspension and the second flexible cable according to another form of the present disclosure.

Referring to FIGS. 2, 3, and 5, when the second control signal is applied to the second clutch 210, the second clutch 210 may be physically coupled to the motor shaft 510, whereby the rotational force of the motor 500 may be transmitted to the second flexible cable 230. A screw 250, which is a component of the suspension 200, may include a separate construction for converting the rotation force of the motor 500 transmitted by the second flexible cable 230 into rectilinear motion. The screw 250 of the suspension may be connected to a control lever 270. The control lever 270 may be installed so as to be rotatable through a lever rotary shaft 275, and operational force may be provided to the control lever 270 by the screw 250 of the suspension. The control lever 270 may be connected to an assist link 280 on the basis of the lever rotary shaft 275. The screw 250 of the suspension may be moved forwards/rearwards in the state of being hinged to one side of the control lever 270 to drive the control lever 270 on the basis of the lever rotary shaft 275, whereby a link mounting point 285 of the assist link 280 may be changed. When the rotational force of the motor 500 is transmitted to the suspension 200, the link mounting point 285 of the assist link 280 may be moved downwards to strongly adjust the suspension of the vehicle. That is, when the rotational force of the motor 500 is transmitted to the suspension 200, the suspension 200 may induce the outside turning rear wheel bumped due to high-speed turning or abrupt lane change of the vehicle so as to be toed in. Specifically, the link mounting point 285 of the assist link 280 may be moved downwards, whereby the toe-in value of the outside turning rear wheel may be increased. When the vehicle is turned at high speed or abruptly changes lanes, therefore, turning stability of the vehicle may be improved, whereby stable traveling performance of the vehicle may be achieved.

Figure 6:
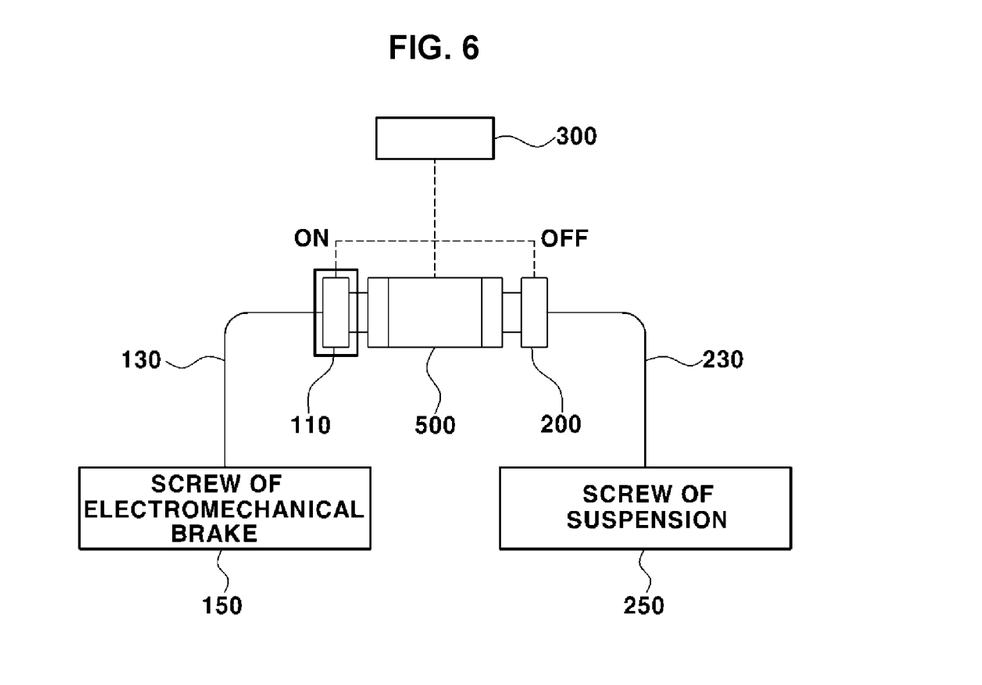
FIG. 6 is a view showing the operation of the electromechanical brake system when the vehicle is braked according to one form of the present disclosure.

FIG. 6 is a view showing the operation of the electromechanical brake system according to one form of the present disclosure when the vehicle is braked.

Referring to FIGS. 3 and 6, the controller 300 may apply a control signal to the first clutch 110 or the second clutch 210 based on a state signal of the vehicle. Upon determining that the vehicle is braked as the result of analyzing the state signal of the vehicle, the controller 300 may apply a control signal for interconnecting the first clutch 110 and the motor 500 to the first clutch 110. Consequently, the first clutch 110 and the motor 500 may be physically connected to each other, and the screw 150 of the electromechanical brake that has received the rotational force generated by the motor 500 may brake the vehicle.

Figure 7:
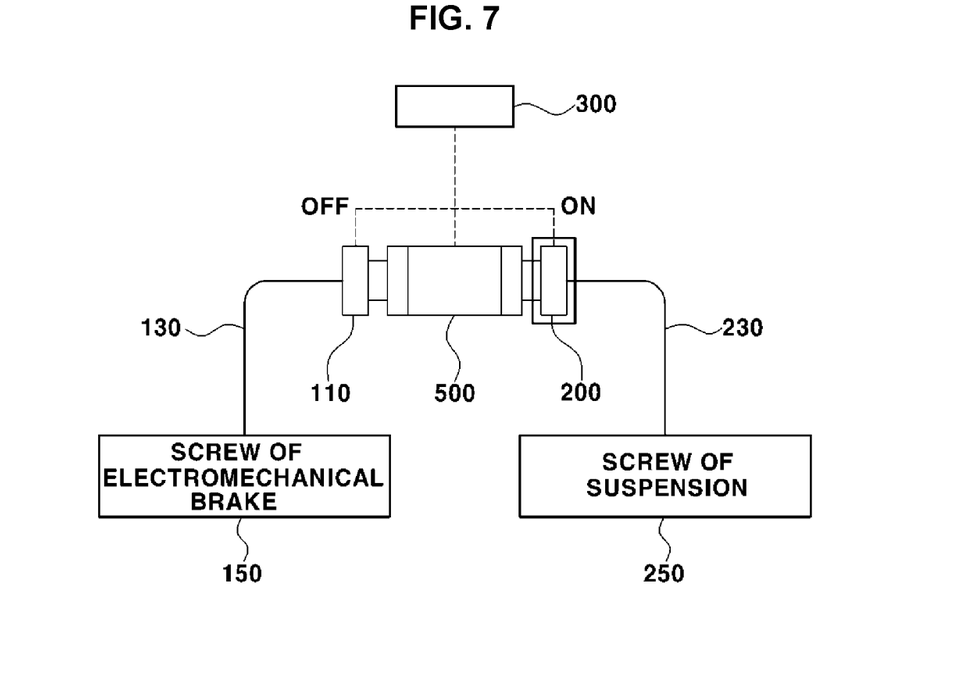
FIG. 7 is a view showing the operation of the electromechanical brake system when the vehicle is abruptly steered according to one form of the present disclosure.

FIG. 7 is a view showing the operation of the electromechanical brake system according to one form of the present disclosure when the vehicle is abruptly steered.

Referring to FIGS. 3 and 7, the controller 300 may apply a control signal to the first clutch 110 or the second clutch 210 based on a state signal of the vehicle. Upon determining that the vehicle is abruptly steered as the result of analyzing the state signal of the vehicle, the controller 300 may apply a control signal for interconnecting the second clutch 210 and the motor 500 to the second clutch 210. Consequently, the second clutch 210 and the motor 500 may be physically connected to each other, and the screw 250 of the suspension that has received the rotational force generated by the motor 500 may strongly adjust the suspension of the vehicle.

Figure 8:
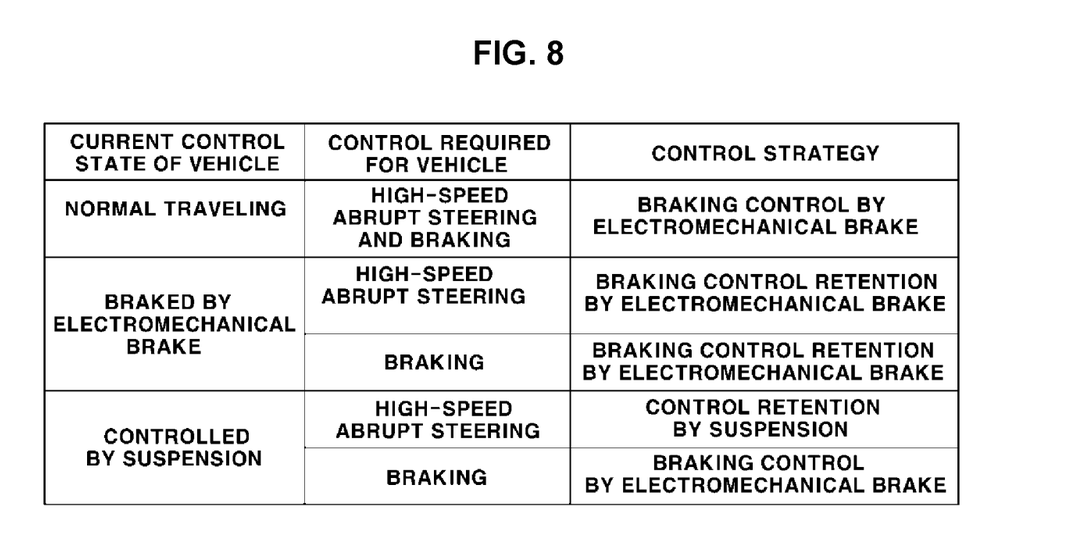
FIG. 8 is a view showing the operation of the electromechanical brake system based on a current control state of the vehicle according to one form of the present disclosure.

FIG. 8 is a view showing the operation of the electromechanical brake system based on a current control state of the vehicle in one form of the present disclosure. For simplicity of description, a duplicate description may be omitted.

Referring to FIGS. 3 and 8, under the situation in which the vehicle is controlled through the electromechanical brake 100 or the suspension 200, the vehicle may be abruptly steered, may be abruptly braked, or may be abruptly steered and abruptly braked.

In one example, upon determining that the vehicle is simultaneously abruptly steered and abruptly braked as the result of analyzing the state signal of the vehicle in the state in which the vehicle is normally traveling, the controller 300 may apply a control signal for interconnecting the first clutch 110 and the motor 500 to the first clutch 110. The first clutch 110 and the motor 500 may be physically connected to each other, and the screw 150 of the electromechanical brake that has received the rotational force generated by the motor 500 may brake the vehicle. When the vehicle is simultaneously abruptly steered and abruptly braked, the control for smoothly performing braking is performed to secure the stability of the vehicle. In order to perform the control for braking the vehicle before adjustment of the suspension, therefore, the controller 300 may perform a control for connecting the electromechanical brake 100 and the motor 500 to each other.

In one example, upon determining that the vehicle is abruptly steered in the situation in which control of the electromechanical brake 100 is performed, the controller 300 may apply a control signal for interconnecting the first clutch 110 and the motor 500 to the first clutch 110. At this time, the first clutch 110 and the motor 500 may already be physically connected to each other. The situation in which control of the electromechanical brake 100 is performed may be the situation in which abrupt braking of the vehicle is desired. At this time, when the vehicle is additionally abruptly steered, the controller 300 may consider control of the electromechanical brake 100 before control of the suspension 200. The controller 300 may keep existing control of the electromechanical brake 100. That is, the controller 300 may continuously apply the control signal to the first clutch 110.

In an example, upon determining that the vehicle is additionally abruptly steered in the situation in which control of the electromechanical brake 100 is performed, the controller 300 may apply a control signal for interconnecting the first clutch 110 and the motor 500 to the first clutch 110. At this time, the first clutch 110 and the motor 500 may already be physically connected to each other. That is, in the case in which a driver increases force applied to the pedal in order to additionally generate higher braking force while performing braking, the controller 300 may keep current applied to the first clutch 110. In other words, the controller 300 may keep existing control of the electromechanical brake 100.

In an example, upon determining that the vehicle is abruptly steered in the situation in which control of the suspension 200 is performed, the controller 300 may apply a control signal for interconnecting the second clutch 210 and the motor 500 to the second clutch 210. At this time, the second clutch 210 and the motor 500 may already be physically connected to each other. The situation in which control of the suspension 200 is performed may be the situation in which abrupt steering of the vehicle is desired. In the case in which the driver additionally steers the vehicle in order to obtain a greater steering change while performs abrupt steering, the controller 300 may keep the current applied to the second clutch 210. In other words, the controller 300 may keep existing control of the suspension 200.

In an example, upon determining that the vehicle is abruptly braked in the situation in which control of the suspension 200 is performed, the controller 300 may apply a control signal for interconnecting the first clutch 110 and the motor 500 to the first clutch 110. At this time, the second clutch 210 and the motor 500 may already be physically connected to each other. In the case in which abrupt braking is desired while abrupt steering is performed, control for smoothly performing braking must be performed first in order to secure stability of the vehicle. In order to perform control for braking the vehicle before adjustment of the suspension, therefore, the controller 300 may perform control for connecting the electromechanical brake 100 and the motor 500 to each other. Consequently, the controller 300 may stop application of the control signal to the second clutch 210, and may apply the control signal to the first clutch 110.

In one form of the present disclosure, the controller 300 may control one of the electromechanical brake 100 and the suspension 200 depending on a current state of the vehicle. Particularly, in the case in which the controller 300 analyzes a state signal of the vehicle requiring control of both the electromechanical brake 100 and the suspension 200, the controller 300 may control the electromechanical brake 100 in order to secure stability of the vehicle.

As is apparent from the foregoing, in one form of the present disclosure, the controller for controlling the electromechanical brake and the controller for controlling the active suspension may be integrated, whereby the number of controllers mounted in the vehicle may be reduced.

In one form of the present disclosure, a single motor may provide driving force to each of the electromechanical brake and the suspension, whereby the number of motors mounted in the vehicle may be reduced.

In another form of the present disclosure, in the case in which the controller analyzes a state signal of the vehicle requiring control of both the electromechanical brake and the suspension, the controller may control the electromechanical brake in order to secure stability of the vehicle. Also, in the situation in which abrupt braking is not required, the controller may control the active suspension. Consequently, it is possible to appropriately operate the electromechanical brake and the active suspension depending on a state of the vehicle, thereby improving marketability of an integrated system including the electromechanical brake and the active suspension.

The forms of the present disclosure have been described with reference to the accompanying drawings. However, it will be apparent to those skilled in the art that the present disclosure may be embodied in specific forms other than those set forth herein without departing from the spirit and basic principles of the present disclosure. Therefore, the above forms should be construed in all aspects as illustrative and not restrictive.

What is claimed is:

1. An electromechanical brake system having a suspension control function, the electromechanical brake system comprising:
   an electromechanical brake provided for and connected to each wheel of a plurality of wheels of a vehicle and configured to brake the vehicle;

a suspension connected to at least one wheel among the plurality of wheels and configured to control suspension of the vehicle;

a motor configured to provide a driving force to each electromechanical brake of the electromechanical brakes or the suspension;

a first clutch configured to selectively connect the electromechanical brakes to the motor;

a second clutch configured to selectively connect the suspension to the motor; and a controller configured to control the motor to be connected to the first clutch or the second clutch based on a state signal of the vehicle.

2. The electromechanical brake system according to claim 1, wherein the state signal indicates whether the vehicle is abruptly steered or braked.

3. The electromechanical brake system according to claim 2, wherein:

the controller is configured to output the state signal by analyzing signals received from a sensor unit mounted in the vehicle, and the sensor unit comprises at least one of a yaw rate sensor, a lateral acceleration sensor, a wheel speed sensor, or a steering angle sensor.

4. The electromechanical brake system according to claim 1, wherein:

the first clutch includes a first coil configured to generate a first magnetic force, and a first coupler configured to be coupled to the motor when the first coupler receives the first magnetic force, the second clutch includes a second coil configured to generate a second magnetic force, and a second coupler configured to be coupled to the motor when the second coupler receives the second magnetic force, and when the first coupler is coupled to the motor, the first clutch is configured to transmit a driving force of the motor to the electromechanical brake, and when the second coupler is coupled to the motor, the second clutch is configured to transmit the driving force of the motor to the suspension.

5. The electromechanical brake system according to claim 1, wherein:

the first clutch and the electromechanical brakes are connected to each other via a first flexible cable, and the first flexible cable is configured to transmit a driving force of the motor to a screw of the electromechanical brakes.

6. The electromechanical brake system according to claim 5, wherein:

the screws of the electromechanical brakes are configured to convert a rotational motion of the first flexible cable into a rectilinear motion, and the screws of the electromechanical brakes are configured to press a frictional pad provided for and configured to brake each wheel of the plurality of wheels of the vehicle.

7. The electromechanical brake system according to claim 1, wherein:

the second clutch and the suspension are connected to each other via a second flexible cable, and the second flexible cable is configured to transmit a driving force of the motor to a screw of the suspension.

8. The electromechanical brake system according to claim 7, wherein:

the screw of the suspension is configured to convert a rotational motion of the second flexible cable into a rectilinear motion, and the screw of the suspension is configured to change a position of an assist link of the suspension.

9. The electromechanical brake system according to claim 1, wherein when the state signal indicates that the vehicle is braked, the controller is configured to connect the first clutch to the motor.

10. The electromechanical brake system according to claim 1, wherein when the state signal indicates that the vehicle is abruptly steered, the controller is configured to connect the second clutch to the motor.

11. The electromechanical brake system according to claim 1, wherein when the state signal indicates that the vehicle is simultaneously braked and abruptly steered, the controller is configured to connect the first clutch to the motor.

12. The electromechanical brake system according to claim 1, wherein when the first clutch is connected to the motor and the state signal indicates that the vehicle is abruptly steered, the controller is configured to continuously connect the first clutch to the motor.

13. The electromechanical brake system according to claim 1, wherein when the second clutch is connected to the motor and the state signal indicates that the vehicle is braked, the controller is configured to connect the first clutch to the motor.

* * * * *